US012797970B2

(12) United States Patent
Wang

(10) Patent No.: US 12,797,970 B2
(45) Date of Patent: Nov. 17, 2026

(54) TWIST DRILL WITH MULTI-STEP DRILL POINT

(71) Applicant: Danyang Kaiyiyuan Tools Co., Ltd., Danyang (CN)

(72) Inventor: Kaibin Wang, Danyang (CN)

(73) Assignee: Danyang Kaiyiyuan Tools Co., Ltd., Danyang City (CN)

(*) Notice: Subject to any disclaimer, the term of this patent is extended or adjusted under 35 U.S.C. 154(b) by 398 days.

(21) Appl. No.: 18/511,704

(22) Filed: Nov. 16, 2023

(65) Prior Publication Data

US 2024/0082929 A1 Mar. 14, 2024

(30) Foreign Application Priority Data

Nov. 18, 2022 (CN) ......................... 202211447719.0
Nov. 18, 2022 (CN) ......................... 202223066030.1

(51) Int. Cl.
*B23B 51/00* (2006.01)
*B23B 51/02* (2006.01)

(52) U.S. Cl.
CPC ............ *B23B 51/009* (2013.01); *B23B 51/02* (2013.01); *B23B 2251/046* (2013.01)

(58) Field of Classification Search
CPC .............................. B23B 51/009; B23B 51/02
See application file for complete search history.

(56) References Cited

U.S. PATENT DOCUMENTS

2020/0094331 A1* 3/2020 Wang ...................... B23B 51/02
2022/0339714 A1* 10/2022 Kraus ................... B23B 51/009
2022/0362863 A1* 11/2022 Wang .................... B23B 51/009
2024/0051039 A1* 2/2024 Garcia .................. B23B 51/009

FOREIGN PATENT DOCUMENTS

CN 214720850 U 11/2021

* cited by examiner

*Primary Examiner* — Kyle A Cook

(57) ABSTRACT

A twist drill with a multi-step drill point includes a shank and a cutting portion. The cutting portion is provided with a spiral flute and a body clearance. A tip of the cutting portion is provided with a chisel edge and a cutting edge. A flank face connected with the cutting edge is provided with a stepped groove which divides the cutting edge into several sections. A pitch of the stepped groove gradually decreases along a direction from the tip of the cutting portion to the shank.

2 Claims, 3 Drawing Sheets

TWIST DRILL WITH MULTI-STEP DRILL POINT

CROSS-REFERENCE TO RELATED APPLICATIONS

This application claims the benefit of priority from Chinese Patent Applications No. 202211447719.0 and No. 202223066030.1, both filed on Nov. 18, 2022. The content of the aforementioned application, including any intervening amendments thereto, is incorporated herein by reference in its entirety.

TECHNICAL FIELD

This application relates to cutting tools, and more particularly to a twist drill with a multi-step drill point.

BACKGROUND

The conventional twist drills use two symmetrically distributed straight-shaped cutting edges to simultaneously complete the desired metal cutting during the drilling operation, and in this case, the power required for drilling is relatively high, and the two cutting edges will suffer from a great reaction force, making the cutting edges susceptible to damage. There is currently a twist drill with a stepped drill tip on the market, which enables the easy positioning during a layered drilling process through the stepped cutting. Moreover, such twist drill also has low cutting resistance, less cutting heat, high drilling efficiency and long service life, which greatly improves the drilling performance of a drill bit. Additionally, this twist drill can achieve the high-precision machining of round holes with less burr generation on the cutting edge, making it popular in the field of machining.

Steps of the conventional step twist drills are generally arranged in parallel, and spaced apart along an axis of the drill bit, and step surfaces are perpendicular to the axis of the drill bit. This design leads to overlapped machining and fails to improve cutting efficiency. Moreover, the cutting chips will remain at the step surfaces, which affects the subsequent processing. Chinese Patent No. 214720850 U disclosed a twist drill with a spiral step drill point, which is provided with a spiral cutting flute, and the pitch gradually increases from a tip of a cutting portion to a shank, which effectively mitigates the machining overlap and greatly increases the cutting speed. However, correspondingly, the cutting output also gradually increases, which accelerates the wear of the drill bit and reduces the service life of the drill bit.

SUMMARY

An object of the present disclosure is to provide a twist drill with a multi-step drill point to overcome the technical defects existing in the prior art.

This application provides a twist drill with a multi-step drill point, comprising a shank and a cutting portion; wherein the cutting portion is provided with a spiral flute and a body clearance; a tip of the cutting portion is provided with a chisel edge and a cutting edge, and a flank face connected with the cutting edge is provided with a stepped groove; the stepped groove is configured to divide the cutting edge into several sections; and a pitch of the stepped groove is configured to decrease along a direction from the tip of the cutting portion to the shank.

In some embodiments, the stepped groove is in a spiral shape; a spiral direction of the stepped groove is the same as a spiral direction of the spiral flute; and a slope of the stepped groove is configured to decrease along the direction from the tip of the cutting portion to the shank.

In some embodiments, a decreasing range of the slope of the stepped groove is 17°-8°.

The present disclosure has the following beneficial effects.

Compared to the prior art, the twist drill described in this application not only reduces the drill bit wear and extends the service life, but also increases the cutting speed.

Figure 1:
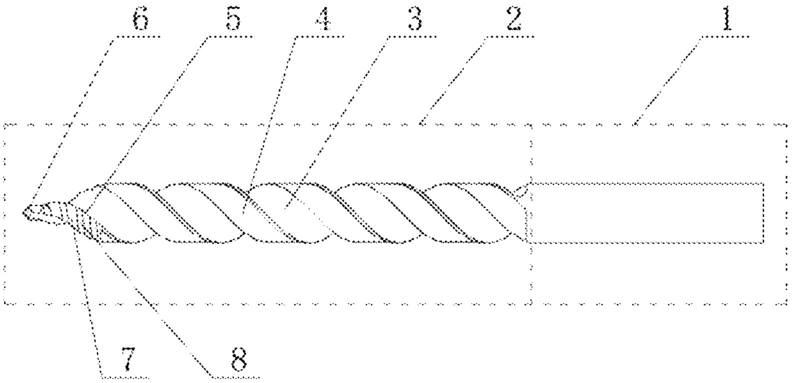
FIG. 1 is an overall schematic diagram of a twist drill with a multi-step drill point according to an embodiment of the present disclosure.

In the drawings: 1—shank; 2—cutting portion; 3—spiral flute; 4—body clearance; 5—cutting edge; 6—chisel edge; 7—flank face; and 8—stepped groove.

DETAILED DESCRIPTION OF EMBODIMENTS

This application will be further described below with reference to the embodiments and accompanying drawings.

Figure 2:
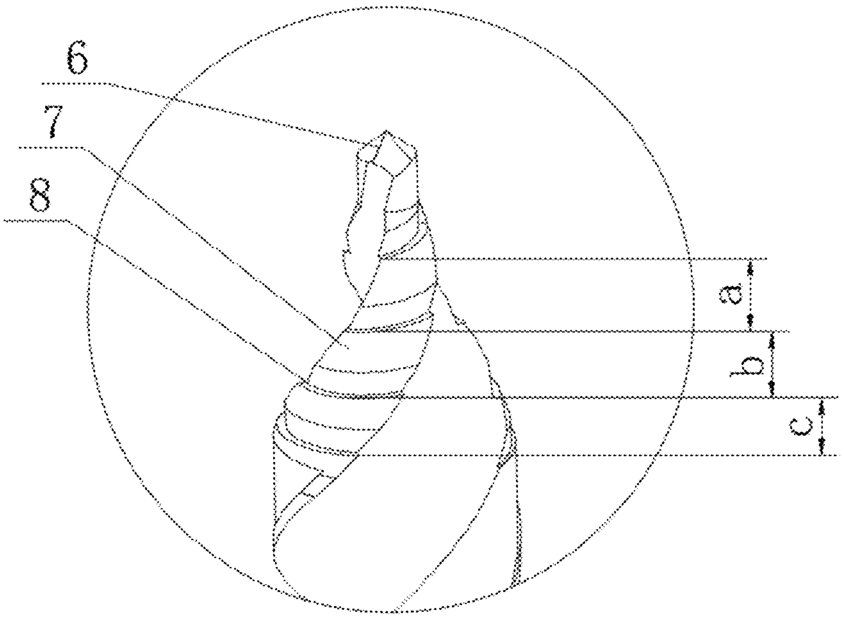
FIG. 2 is a perspective view of a cutting portion of the twist drill according to an embodiment of the present disclosure.
Figure 3:
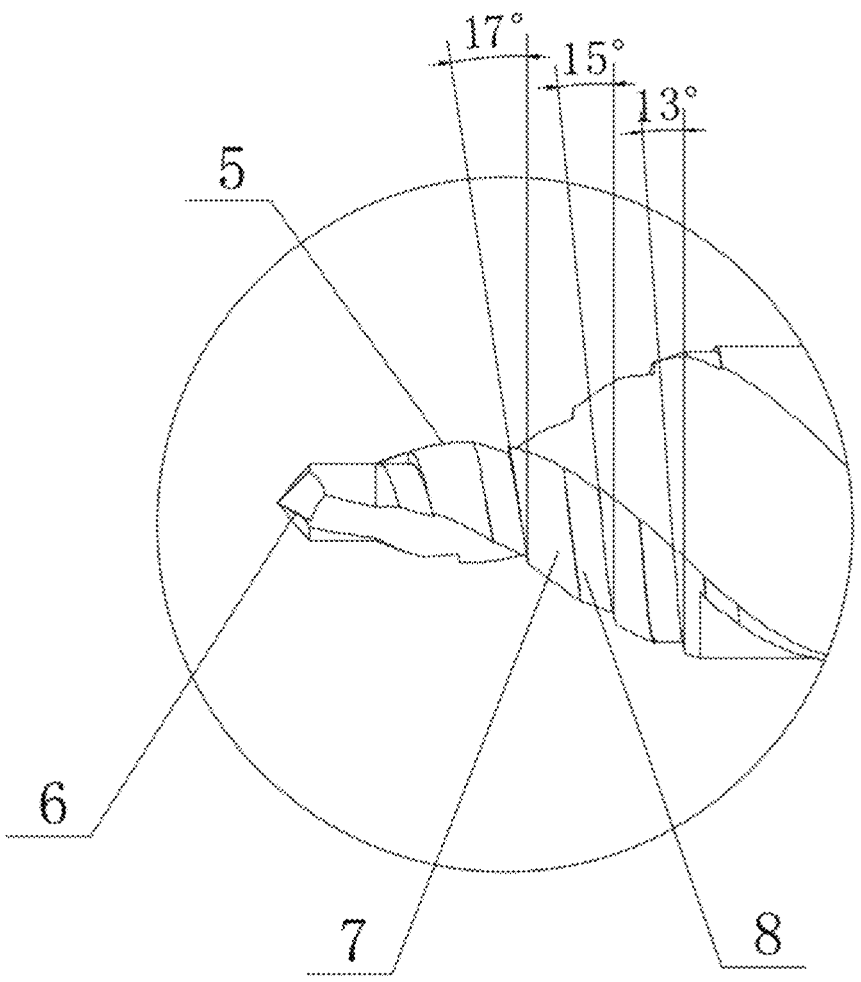
FIG. 3 is a front view of the twist drill according to an embodiment of the present disclosure.

As illustrated in FIGS. 1-3, a twist drill with a multi-step drill point is provided, which includes a shank 1 and a cutting portion 2. The cutting portion 2 is provided with a spiral flute 3 and a body clearance 4. A tip of the cutting portion 2 is provided with a chisel edge 6 and a cutting edge 5. A flank face 7 connected with the cutting edge 5 is provided with a stepped groove 8, which divides the cutting edge 5 into several sections. A pitch of the stepped groove 8 gradually decreases along a direction from the tip of the cutting portion 2 to the shank 1. As illustrated in FIG. 2, pitch a>b>c.

Keeping cutting as much distance as possible at a position with a small outer diameter makes a product with a small head subjected to small resistance with a high cutting speed when cutting. This follows a principle and law of gradual progress, in line with cutting characteristics of the product. When a first step is pushed into a test block, based on the characteristics of the spiral groove of the tip, a second step, a third step and so on are driven to enter into the test block in sequence only with a small force, so that the drill bit can automatically cut inward. This design effectively improves the cutting speed and efficiency of the drill bit, and also reduces wear of the drill bit, thereby making its service life longer. Moreover, the twist drill provided herein can significantly reduce the labor intensity and improve the positioning precision when applied to a handheld drill, and the machined workpiece has better roundness and finish.

In another embodiment, the stepped groove 8 is in a spiral shape. A spiral direction of the stepped groove 8 is in the same as a spiral direction of the spiral flute 3. A slope of the stepped groove 8 is configured to gradually decrease along a direction from the tip of the cutting portion 2 to the shank 1, as illustrated in FIG. 3.

The slope of the stepped groove 8 is determined by a resistance of the drill bit during cutting. When the slope is larger, a cutting speed is higher and a force is smaller under same conditions. Therefore, a larger slope can be set on the steps with a small outer diameter of the head, so that the product can be quickly positioned and entered into a workpiece. When the first step is pushed into the workpiece, the subsequent steps can cut and feed into the workpiece relatively easily, which only need a little extra force. Therefore, the slope of the stepped groove 8 decreases by analogy. A specific decrease refers to an angle requirement range of each specification of a conventional head drill bit of a twist drill, which is normally 17°-8°. This allows the product to perform at a best level. Meanwhile, based on the decreasing slope, the step with a maximum outer diameter of the product has a short distance, a small front angle and a small rear angle, which ensures the speed and the wear resistance.

In a first test, a cutting speed of the multi-step drill point twist drill was tested by using a pistol drill to cut a German ST37 test block with a thickness of 5 mm.

An ordinary step drill with a specification of 6 mm and a lifting weight of 8 kg was used, and 201 holes were drilled, with an average cutting time of 3.65 s. The multi-step drill point twist drill in this disclosure with same specifications was used to drill under a same condition, with an average cutting time of 3.3 s. It can be seen that the multi-step drill point twist drill has a higher cutting speed, which is about 10% higher than that of the ordinary step drill.

An ordinary step drill with a specification of 10 mm and a lifting weight of 10 kg was used to drill, and 201 holes were drilled, with an average cutting time of 5.5 s. The multi-step drill point twist drill in this disclosure with same specifications was used to drill under a same condition, with an average cutting time of 5.03 s. It can be seen that the multi-step drill point twist drill has a higher cutting speed, which is about 9% higher than that of the ordinary step drill.

In a second test, a service life of the multi-step drill point twist drill was tested by using a pistol drill to cut a 304 stainless steel with a thickness of 4 mm.

An ordinary step drill with a specification of 6 mm and a lifting weight of 8 kg was used to drill. 32 holes were drilled, while a head of the ordinary step drill was burned, and then the cutting was stopped. The multi-step drill point twist drill in this disclosure with same specifications was used to drill under a same condition. 38 holes were drilled, while a head of the multi-step drill point twist drill was burned, and then the cutting was stopped. It can be seen that the multi-step drill point twist drill has better service life and wear resistance, which are about 19% higher than that of the ordinary step drill.

An ordinary step drill with a specification of 10 mm and a lifting weight of 10 kg was used to drill. 30 holes were drilled, while a head of the ordinary step drill was burned, and then the cutting was stopped. The multi-step drill point twist drill in this disclosure with same specifications was used to drill under a same condition. 36 holes were drilled, while a head of the multi-step drill point twist drill was burned, and then the cutting was stopped. It can be seen that the multi-step drill point twist drill has better service life and wear resistance, which are about 20% higher than that of the ordinary step drill.

The embodiments disclosed above are merely illustrative of the disclosure, and are not intended to limit the present disclosure. It should be understood that any modifications, changes and replacements made by those skilled in the art without departing from the spirit of the disclosure shall fall within the scope of the disclosure defined by the appended claims.

What is claimed is:

1. A twist drill with a multi-step drill point, comprising:

a shank; and a cutting portion;

wherein the cutting portion is provided with a spiral flute and a body clearance; a tip of the cutting portion is provided with a chisel edge and a cutting edge, and a flank face connected with the cutting edge is provided with a plurality of stepped grooves; the plurality of stepped grooves are configured to divide the cutting edge into several sections; and pitch of the plurality of stepped grooves decreases along a direction from the tip of the cutting portion to the shank; and the plurality of stepped grooves are arranged in a spiral shape; a spiral direction of the plurality of stepped grooves is the same as a spiral direction of the spiral flute; and slope of the plurality of stepped grooves decreases along the direction from the tip of the cutting portion to the shank.

2. The twist drill of claim 1, wherein a decreasing range of the slope of the plurality of stepped grooves is 17°-8°.

* * * * *